United States Patent Office 3,506,862
Patented Apr. 14, 1970

3,506,862
DYNAMIC AND EDDY CURRENT RAILWAY BRAKE DEVICE
Yoshio Nomura and Hisakazu Sookawa, Tokyo-to, Japan, assignors to Nippon Kokuyu Tetsudo (known in English as Japanese National Railways), Tokyo-to, Japan
Filed July 12, 1967, Ser. No. 652,965
Claims priority, application Japan, July 15, 1966, 41/45,895
Int. Cl. B60l 7/28; H02k 49/04
U.S. Cl. 310—93                                           4 Claims

ABSTRACT OF THE DISCLOSURE

A combination of a dynamic brake device and an eddy-current brake device which has electromagnets confronting each rail at a constant gap distance and energized by the load current generated by the dynamic brake device in exerting dynamic braking force. The resultant braking force equal to the sum of the braking forces respectively produced by the two devices is utilized to brake the vehicle on which the brake devices are mounted.

---

This invention relates to brake systems for braking moving structures such as vehicles supported on wheels running on one or more rails.

In general, in brake systems in which use is made of barking devices such as drum brakes, disk brakes, and dynamic brakes (also known as rheostatic brakes or electric generation brakes) known heretofore for braking wheels of vehicles relative to rails on which they are rolling, the braking force of each brake system cannot be made greater than the product of the coefficient of adhesion between the wheels and the rails and the gross weight of the vehicle. If this limit is exceeded, not only will the wheels slip to cause damage to the wheels and the rails, but the braking distance will also be increased to increase danger.

The coefficient of adhesion between a wheel and a rail decreases with increase in the velocity of the wheel, that is, of the vehicle, as pointed out more fully hereinafter. Consequently, the higher the vehicle speed is, the lower is the value to which the braking fore must be restricted. Thus, this relationship has heretofore constituted a tremendous obstacles with respect to braking safety for high-speed vehicles.

For the above stated reason it has been a general practice to control the braking force in accordance with the relationship between braking force and speed as the speed is reduced or to increase the braking force in several steps as the speed is reduced. In the case of a dynamic brake, while the braking force can be increased by increasing the limit current value, this method is disadvantages in that the brake system becomes complicated.

In addition, electromagnetic brakes of the type in which electromagnets are caused to be attracted and adhere directly to the rails are also known. This type of brake has the disadvantage of frictional wear of both the magnetic and the rails. In a brake of this type, the braking force of each brake unit is the product of the attractive force and the coefficient of friction between the rail and the electromagnet. In this case, since the coefficient of friction, differing from the aforementioned coefficient of adhesion, becomes a sliding frictional coefficient, it assumes a magnitude which is of a considerably lower order than the adhesion coefficient at the same speed. Furthermore, since the magnetic attractive force also decreases at high speeds, the braking force, determined by the product of the attractive force and the frictional coefficient, decreases remarkably with increasing speed.

It is an object of the present invention to overcome the above described difficulties accompanying known braking systems for wheels running on rails and to provide a braking system whereby high braking force can be obtained in a simple manner.

More specifically, an object of the invention is to provide a brake system of non-rubbing type for wheels running on one or more rails by which a very high resultant braking force can be produced as a sum of the braking forces produced by a dynamic braking device and by an eddy-current braking device, irrespective of the coefficient of adhesion between the wheels and rails and without the use of a separate power supply for the eddy-current braking device.

Another object of the invention is to provide a brake system of the above stated character by which a high braking force can be produced at substantially constant value at all vehicle speeds above low speed.

Still another object of the invention is to provide a brake system in which no parts for rubbing action on the rails are used thereby to afford high durability and reliability for safety and to afford economy.

A further object of the invention is to provide a brake system in which the resultant braking force can be controllably varied.

Other objects and advantages of the invention will become apparent as the disclosure proceeds.

According to the present invention, briefly summarized, there is provided a non-rubbing type brake system of the above stated character in which the load current generated by a dynamic brake device operated at a braking force which will not give rise to slipping of the wheels is supplied to a non-rubbing type eddy-current brake device to induce eddy currents within the rail or rails on which the vehicle is running or adjacent rails and thereby to produce an eddy-current braking force which, in combination with the braking force produced by the dynamic brake device, is utilized, whereby a high, controllable, resultant braking force of substantially constant magnitude over all vehicle speeds above low speed is produced.

The nature, principle, details, and utility of the invention will be more clearly apparent from the following detailed description when read in conjunction with the accompanying drawings, in which like parts are designated by like reference numerals.

Figure 1:
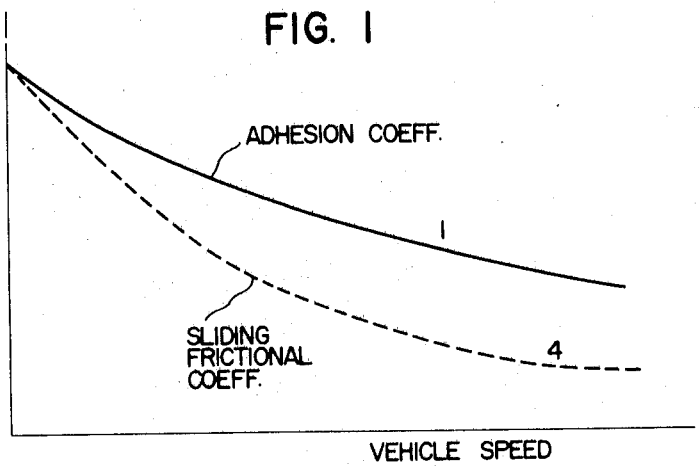
FIG. 1 is a graphical representation indicating relationships of coefficient of adhesion and sliding friction coefficient to vehicle speed.

Referring to FIG. 1, it is to be observed from curve 1 that the adhesion coefficient between a railway wheel and the rail decreases with increasing vehicle speed as mentioned hereinbefore. Accordingly, braking forces exceeding those indicated by curve 2 in FIG. 3 cannot be applied in a braking system of the type depending on adhesion between the wheels and the rails. Therefore, it has been the general practice to control the braking force in a manner to follow curve 2 in FIG. 3 as the speed decreases or to increase the braking force in a number of steps with decreasing speed as indicated by curve 3 in FIG. 3.

FIG. 1 indicates the aforementioned remarkably low values of sliding frictional coefficient, as indicated by curve 4, in comparison with values of adhesion coefficient at corresponding speeds, whereby, and also because of reduced magnetic attractive force at high speeds, the braking force of a brake with electromagnets adhering directly to the rails decreases remarkably with increasing speed.

In the brake system according to the present invention, a large, substantially constant braking force can be produced in a speed region of from high speeds to relatively low speeds. Moreover, another feature of this brake system is that the braking force can be controlled at will be varying the ampere turns of the electromagnetic coils as indicated parametrically by curves 5, 6, and 7 in FIG. 2.

Figure 4:
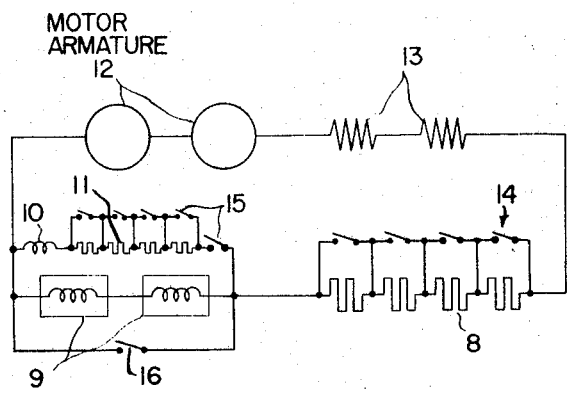
FIG. 4 is an electrical connection diagram indicating the essential organization of one example of embodiment of the invention.

In a preferred embodiment of the invention as illustrated by the electrical connection diagram shown in FIG. 4, a number of eddy-current brake devices 9 are connected in series with load resistors 8 for dynamic brakes and in parallel with an inductive shunt comprising an induction coil 10 and resistors 11. Dynamic braking is accomplished by main motors having armatures 12 and respective field systems 13 connected as shown. Switches 14 and 15 are provided for on-off switching respectively of resistors 8 and 11. A switch 16 is provided for short circuiting the eddy-current brake devices 9.

The braking force of the brake device for electromagnetically inducing eddy currents in the rails according to the invention is automatically controlled by variation of the ampere turns of electromagnets, that is, the current passed through the electromagnets. When this current is reduced owing to slowing down of the vehicle, the braking force is varied with the speed of the vehicle, as indicated by curves 5, 6 and 7 in FIG. 2, which curves parametrically represent decreasing current values in the order given. On the other hand, the magnetic attractive force with respect to the rails also varies, as indicated parametrically by curves 17, 18, and 19 in FIG. 2.

At a constant current, the braking force becomes substantially constant at speeds above a certain speed as indicated, for example, by curve 5, and the attractive force with respect to the rails decreases with increasing speed.

Current control is accomplished by means of switches 14 and 15. The braking force of the dynamic brake and the braking force of the rail brake are controlled simultaneously by the on-off operations of the switches 14 of the load resistors 8 for the dynamic brake, while, by the on-off operations of the switches 15, the braking force of the dynamic brake does not change, and only the braking force of the rail brake can be varied. When the short-circuiting switch 16 is closed, the rail eddy-current brake devices are rendered inoperative.

Figure 5:
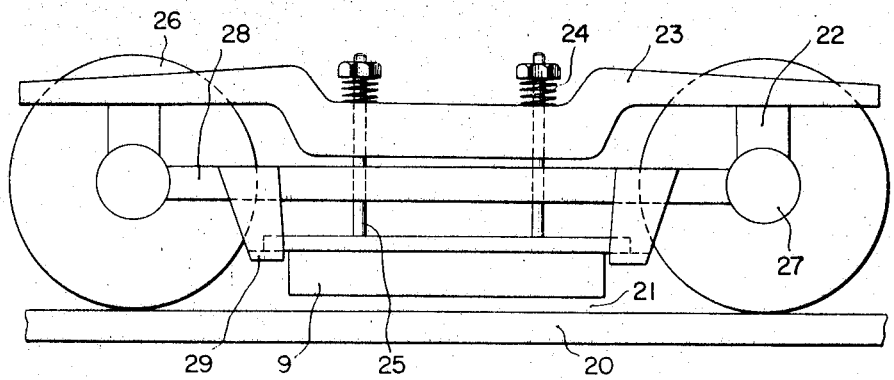
FIG. 5 is a simplified side elevational view showing one example of installation of a brake system according to the invention in a railway bogie (or truck)

In one example of reduction of the present invention to practice as illustrated in FIG. 5, an eddy-current brake device 9 constituting a rail brake is mounted on the bogie with a specific gap 21 between the lower surface of the device 9 and the upper surface of the rail 20 on each side of the bogie. The load current of a dynamic brake is passed through this rail brake device 9 as indicated in FIG. 4.

During its use, the brake device 9 must be disposed below the axle springs in order to maintain the gap 21 constant, but when the brake device 9 is not being used, it can be raised above the axle springs by a suitable mechanism. That is, the brake device 9 is so mounted that, when it is not in use, it is suspended from the bogie frame 23 above the axle springs 22 by a suspension device including support springs 24 and suspension rods 25 and, when it is being used, the brake device 9 is supported on stop brackets 29 fixed to an axle beam 28 secured to the journal boxes 27 of the wheels 26, whereby the attractive force toward the rail 20 imparted to the brake device 9 is received and resisted by the brackets 29 thereby to maintain the gap 21 constant.

When the brake device 9 is used while the vehicle is running, the magnetic flux generated by the electromagnets 30 within the brake device 9 acts on the rail 20 and induces the flow of eddy currents within the rail 20 in directions such that the traveling movement of the vehicle is retarded. That is, the interaction of the magnetic flux due to the eddy currents and the magnetic flux generated by the electromagnets 30 produces braking force.

In this brake system, since the brake device 9 is maintained at a constant gap 21 from the rail 20, there is no direct mechanical contact thereof with the rail 20. Therefore, there is no possibility of wear or damage of the rail and the electromagnets 30 due to mutual rubbing contact.

Figure 2:
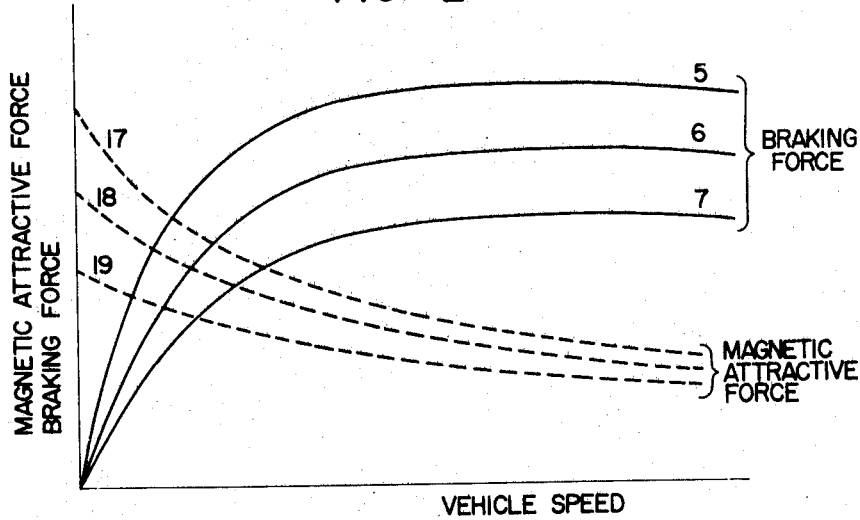
FIG. 2 is a graphical representation indicating relationships of braking force and attractive force toward rails to vehicle speed in the case wherein eddy currents within the rails are utilized in a non-rubbing type bogie brake system.
Figure 3:
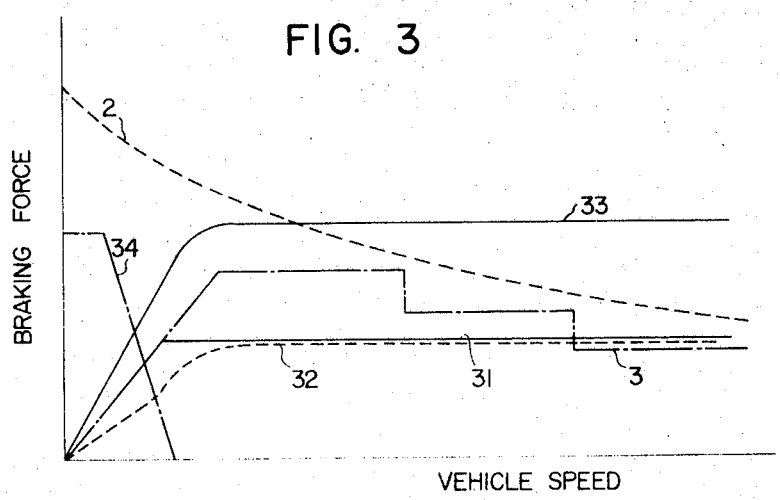
FIG. 3 is a graphical representation showing braking force versus vehicle speed curves in the case wherein a dynamic brake is used as an adhesion brake and in the case wherein a dynamic brake and a rail eddy-current brake are combined.

The braking force produced by this rail brake device is as indicated by curves 5, 6, and 7 in FIG. 2. Then, when a current resulting from the production of a dynamic braking force such as that indicated by curve 31 in FIG. 3 is passed through the eddy-current braking device 9, the brake device 9 produces a braking force as indicated by curve 32, whereby the combined braking force of braking forces 31 and 32 becomes that indicated by curve 33. Thus, an extremely high braking force in comparison with that obtainable with only the dynamic brake can be produced throughout most of the speed range up to high speed without the restrictive influence of the adhesion coefficient.

Figure 6:
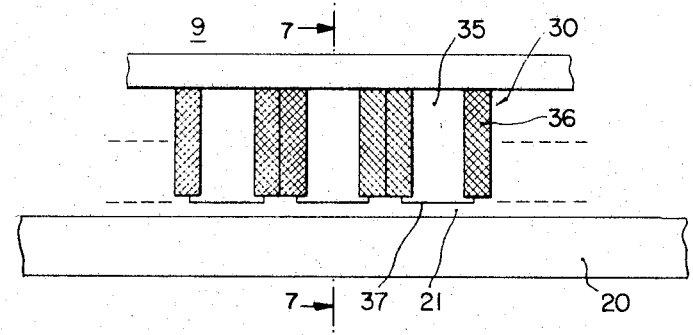
FIG. 6 is a side elevational view with the coils of electromagnets shown in section, showing an example of the eddy-current braking device according to the present invention.
Figure 7:
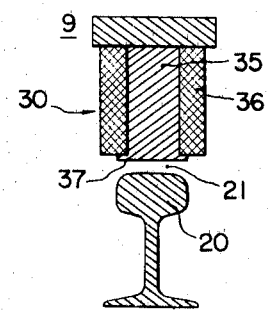
FIG. 7 is a vertical sectional view along line 7—7 in FIG. 6.

FIGS. 6 and 7 show in detail, the electromagnets 30 of the eddy-current brake device 9 shown in FIGS. 4 and 5. The electromagnets 30 are arranged in a row parallel to the rail as seen in FIG. 6 and at a constant gap 21 from the rail surface as clearly shown in FIG. 7. Furthermore, the electromagnets 30 comprise iron cores 35 having poles 37 and coils 36 and are attached to a common iron frame 38, said coils 36 being connected in series so that when they are supplied with a current, polarities of their poles 37 become alternately N, S, N, S . . . . Each of the left and right sides of a vehicle bogie is provided with the above-mentioned eddy-current braking device 9 attached thereto, and said left and right eddy-current braking devices 9 are connected in series with each other and with the load circuit of the dynamic brake device 12, 13 as shown in FIG. 4, thereby to protect the vehicle from generation of unbalanced right and left braking forces and to secure safety of the vehicle. The relationship of the electromagnets 30 with respect to the rail cross section is so selected that the leakage flux will be a minimum, and the flux density will be high, as indicated in FIG. 7.

At low speeds, since both the dynamic braking force and the rail braking force decrease, a mechanical type of braking force (as indicated by cruve 34 in FIG. 3) is applied, within the limit imposed by the adhesion force, to make up for the decrease in braking force. On one hand, while the attractive force, in conventional cases, increases with decreasing speed, in the case of this invention since the power generated by the dynamic brake is used for energizing the electromagnets, the attractive force with respect to the rail also decreases as the dynamic braking force decreases.

As will be apparent from the foregoing description, the present invention provides a brake system wherein electromagnets energized by current generated by a dynamic brake device are mounted on each bogie of a vehicle running on rails to cause electromagnetic effect to be imparted through a constant gap to the rails thereby to product a braking force, which is combined with braking force produced by the dynamic brake device to impart a very high braking force in a simple manner to the bogie irrespective of the adhesion coefficient between the wheels and rails.

In addition, the braking system of the above described organization according to the invention has the following principal features.

(1) Since the dynamic brake circuit is connected in series with the eddy-current brake circuit, and the power generated by the dynamic brake is consumed within the rail eddy-current brake device, a special power source for the eddy-current brake is not necessary. Accordingly, economy in brake power and safety in vehicle running operation are afforded.

(2) The braking force can be easily controlled by adjustably varying the current to the eddy-current brake device. Furthermore, unbalance between the braking forces on the left and right sides of each bogie can be eliminated.

(3) Since the eddy-current brake device is mounted on the bogie and does not contact the rail, the brake device and rail are not subject to frictional wear and damage, whereby safety and economy are afforded.

(4) High braking force and low attractive force are produced by the alternate arrangement N, S, N, S . . . of the electromagnet poles confronting the rail.

(5) By the arrangement of the electromagnets to face the upper surface of the rail, a substantially constant braking force can be obtained from high speed to low speed, which relationship between braking force and speed is optimum for a brake system of a vehicle.

(6) Since the brake system is independent of the adhesion between the wheels and the rails, amply high braking forces can be applied without any adverse results whatsoever with respect to the vehicle running operation.

It should be understood, of course that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What we claim is:

1. A non-rubbing type brake system for a car vehicle comprising a bogie with wheels running on at least one rail which comprises, in combination, a dynamic braking device coupled to the vehicle wheels for generating a dynamic braking force partly braking the vehicle bogie in the running state of said bogie by generating an electric current; an eddy-current braking device for generating an eddy-current braking force additionally braking the vehicle bogie in the running state of said bogie, said device comprising electromagnets of left and right rows mounted on the bogie respectively on the left and right lateral sides thereof, each of said rows being directed along the longitudinal direction of the rail, said electromagnets being of the same dimension and structure and supported by a common frame to have a certain air gap between pole surfaces of the electromagnets and the rail surface, all electromagnets of a row being connected in series so that pole surfaces of the electromagnets of each row confronting the rail have alternately N, S, N, S . . . polarities, and the electromagnets of one row being connected in series with the electromagnets of the other row, and said electromagnets being connected to the load circuit of said dynamic braking device to induce eddy-currents within the rails and thereby to produce an eddy-current braking force; and control means for controlling the current passing through the electromagnets of both rows.

2. A non-rubbing type brake system for a vehicle with wheels running on at least one rail, according to claim 1, in which the control means comprises load resistors connected in series with the circuit of the dynamic braking device and switch members adapted selectively to shunt and insert said resistors.

3. A non-rubbing type brake system for a vehicle with wheels running on at least one rail, according to claim 1, in which the control means comprises load resistors connected in series with the circuit of the dynamic braking device, switch members adapted to shunt and insert said load resistors, further resistors connected in parallel with the eddy-current braking device, and further switch members adapted to open and insert said further resistors.

4. A brake system as claimed in claim 1, in which the eddy-current braking devices are mounted to confront another rail laid parallel to the main rail for supporting the vehicle.

References Cited

UNITED STATES PATENTS

| | | | |
|---|---|---|---|
| 2,006,785 | 7/1935 | Baughman | 310—93 |
| 3,307,058 | 2/1967 | Kucera | 310—93 |
| 269,092 | 12/1882 | Molera | 105—78 XR |
| 283,759 | 8/1883 | Daft | 105—77 XR |
| 467,243 | 1/1892 | Walter | 105—77 XR |
| 671,482 | 4/1901 | Herkner | 105—78 |
| 1,628,262 | 5/1927 | McGinnis | 105—78 XR |
| 1,661,622 | 3/1928 | Pieper | 105—77 XR |
| 2,270,425 | 1/1942 | Farmer | 105—77 XR |

ARTHUR L. LA POINT, Primary Examiner

H. BELTRAN, Assistant Examiner

U.S. Cl. X.R.

104—148; 105—61, 76, 77; 188—159, 164; 318—375